(12) United States Patent
Pisoni et al.

(10) Patent No.: US 6,526,866 B2
(45) Date of Patent: Mar. 4, 2003

(54) RADIAL SEALED AIR BRAKE CHAMBER

(75) Inventors: Steffen Pisoni, Mannheim (DE); Georg Sulzyc, Eppelheim (DE)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 09/829,099

(22) Filed: Apr. 9, 2001

(65) Prior Publication Data

US 2002/0144593 A1 Oct. 10, 2002

(51) Int. Cl.$^7$ ................................................ F01B 19/00
(52) U.S. Cl. ........................................................ 92/98 R
(58) Field of Search ................................. 92/98 R, 126

(56) References Cited

U.S. PATENT DOCUMENTS

| | | | | |
|---|---|---|---|---|
| 5,263,403 A | * | 11/1993 | Choinski et al. | 92/98 R |
| 5,315,918 A | | 5/1994 | Pierce | 92/63 |
| 5,361,877 A | | 11/1994 | Graham | |
| 5,676,036 A | * | 10/1997 | Choinski | 92/98 R |
| 5,937,733 A | | 8/1999 | Stojic | 92/63 |
| 5,992,297 A | | 11/1999 | Plantan et al. | 92/98 R |
| 6,012,378 A | | 1/2000 | Hicks | 92/63 |
| 6,405,635 B1 | * | 6/2002 | Smith et al. | 92/98 R |

FOREIGN PATENT DOCUMENTS

DE     41 10 542 A1    10/1992

* cited by examiner

*Primary Examiner*—Edward K. Look
*Assistant Examiner*—Thomas E. Lazo
(74) *Attorney, Agent, or Firm*—St. Onge Steward Johnston & Reens LLC

(57) ABSTRACT

A service brake actuator having a housing base having a center portion and a housing cover having a center portion is provided. The center portion of the housing base and the center portion of the housing cover telescopingly fit together in an assembled position and define an annular space therebetween. A diaphragm having a thickness greater than the thickness of the annular space between the center portion of the housing base and the center portion of the housing cover is held in the annular space by radial forces generated by compression of the diaphragm in the annular space. It should be understood that the magnitude of the radial forces holding the diaphragm in the annular space is variable depending on the thickness of the annular space.

19 Claims, 4 Drawing Sheets

RADIAL SEALED AIR BRAKE CHAMBER

FIELD OF THE INVENTION

The present invention relates to an air brake system actuator, and more particularly to an improved air brake chamber, or service brake actuator, for use with such an air brake system.

BACKGROUND OF THE INVENTION

Fluid-operated braking systems such as air brake systems have long been used to control the movement of motor vehicles in a safe and effective manner. In particular, air brakes are commonly used on commercial vehicles, such as trucks which typically have large gross vehicle weights. The considerable inertial mass of these heavy-duty vehicles in combination with the high speeds at which they travel require a braking system which responds rapidly with substantial braking power. One system component which is instrumental in the operation of air brake systems is the brake actuator. The brake actuator provides the force necessary when braking a vehicle. Commercial air brake actuators can actuate the normal surface brakes as well as parking/emergency brakes. The brake actuators typically have a network of air chambers defined by one or more diaphragms and/or pistons and a plurality of springs which operate to provide the appropriate braking action in response to inputs by the vehicle driver. In the event an air braking system loses pressure, the brake actuator automatically engages the vehicle brakes.

More specifically, conventional air brake actuators have both a service brake actuator for actuating the brakes under normal driving conditions by the application of compressed air and a spring-type emergency brake actuator which causes actuation of the brakes when air pressure has been released. The emergency brake actuator includes a strong compression spring which forces application of the brake when air is released. This is often referred to as the spring brake.

Typically, the spring brake actuator is disposed in tandem with the service brake actuator. When full pressure is applied to the spring brake actuator, air pressure acting against a diaphragm compresses the compression spring. A spring brake actuator rod is held in a retracted position by a relatively small return spring, thus not affecting the operation of the brake. When the brake is to be applied during normal driving operation, compressed air is provided to the service brake actuator which, acting against a diaphragm, causes a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the compression spring acting on the spring brake actuator rod which in turn acts upon the service brake push rod to apply the brakes. Thus, the spring brake portion serves both as a parking brake and an emergency brake.

In a typical prior art air brake system, the spring brake actuator and the service brake actuator are disposed in a single housing comprising a spring brake portion and a service brake portion. The service brake portion includes an air chamber partially defined by a flexible service diaphragm acting against a service brake push rod and a return spring to assure proper release of the brake when air is exhausted from the air chamber. The spring brake portion includes a spring chamber and an air chamber, both partially defined by a spring brake diaphragm acting against a spring pressure plate to compress the compression spring in the spring chamber when air pressure is applied to the spring brake diaphragm in the air chamber. An actuating rod extends through the spring brake diaphragm to integrally connect with the pressure plate. In operation, it is pushed outwardly from the air chamber through a housing opening and bearing provided with a pneumatic seal to engage the service diaphragm and push rod of the service brake, thereby causing the brake to be applied. The spring brake diaphragm is provided with a centrally disposed aperture having an annular edge and the actuator rod extends through the opening and engages the annular edge to form an airtight seal. The actuator rod is hollow with a central bore and a brake releasing caging bolt extends into the central bore. An end plate on the bolt engages the spring brake pressure plate to draw the spring to a compressed state when the spring is caged by rotation of the bolt.

In brake actuators of this type, such as those disclosed in U.S. Pat. Nos. 5,315,918, 5,361,877, 5,937,733 and 6,012,378, the diaphragms are typically flexible, cup-shaped and have an outer radial rim which is received and compressed between flange portions of a housing and cover. Such diaphragms are generally formed of a rubber material with a fibrous reinforcement disposed therein. Diaphragms are often molded in an ovoid shape making it somewhat difficult to align and assemble the diaphragm in the brake actuator housing. The difficulties in assembly can often lead to leakage of the seal established between the diaphragm and the flange portions of the housing and cover. Great care is taken in the manufacture of the brake actuators in order to test for leaking actuator assemblies, identify leaking brake actuators assemblies, and to eliminate leaking brake actuator assemblies. If the brake actuator assembly leaks, the brake actuator may fail.

Moreover, in this type of brake actuator assembly, it is important during assembly that the rim portion of the flexible diaphragm be properly seated and aligned prior to being compressed between the opposed radial flanges of the housing and the cover. During assembly the flexible diaphragm must be coaxially aligned with the radial flanges of the opposed housing members. However, due to the ovoid shape of typical diaphragms as received from the manufacturer and curvature of the surfaces of the opposed radial flanges, alignment of the diaphragm and housing is difficult, thereby increasing the potential for leakage.

Additionally, the thickness of radial rim portion of the diaphragm causes difficulty in the assembly of the brake actuator. The thickness of the rim portion of the diaphragm requires that the housing and cover be placed in compression against the diaphragm during assembly in order to facilitate the application of a band clamp which holds the housing and cover in sealing engagement with the diaphragm.

These problems associated with traditional brake actuator assemblies were attempted to be addressed by U.S. Pat. No. 5,922,297 which discloses a brake actuator assembly which includes a housing having an open end and a generally radial annular flange portion surrounding the open end, a cover having a generally radial annular flange portion generally coaxially aligned with the generally radial annular flange portion of the housing, a cup-shaped flexible diaphragm having an outer radial annular rim portion located between the generally radial annular flange portions of the housing and the cover, and an annular clamp which may be separate or integral with one of the housing members generally surrounding and compressing the generally radial annular flange portions of the housing and cover against the rim portion of the flexible diaphragm. The rim portion of the diaphragm includes a wedge-shaped edge portion and co-axially aligned flats on opposite sides of the rim portion adjacent the wedge-shaped edge portion which aligns the flange portions of the housing and the cover.

While this design may aid in the assembly of the brake actuator, and possibly reduce the frequency of leaks caused by misalignment of the diaphragm during assembly, it still suffers from disadvantages of its own. One of these disadvantages is that, like the prior art described above, the actuator disclosed in U.S. Pat. No. 5,922,297 relies on the axial compression forces between the two parts of the actuator housing (i.e., the flanges on the service housing and the service housing cover), and thus on the force exerted by the clamp band holding the two parts together, in order to hold the diaphragm in place. This is undesirable for a number of reasons, one of which is that the tightness of the chamber (i.e., the forces sustainable by the diaphragm within the chamber) is dependent upon the axial compression forces between the housing parts during assembly. Thus, for example, if it is desirable to increases the forces sustainable by the diaphragm without the diaphragm pulling away from the housing, it is necessary to exert a greater clamping force on the housing during assembly. Such is imprecise and may be difficult to achieve, and is therefore undesirable.

What is desired, therefore, is a service brake actuator which is easy to assemble, which is not prone to leaks, which includes a diaphragm which is readily properly seated, which does not rely on axial compression forces between parts of the actuator housing in order to hold the diaphragm in place, and which allows for the forces sustainable by the diaphragm to be readily varied.

SUMMARY OF THE INVENTION

Accordingly, it is an object of the present invention to provide a service brake actuator which is easy to assemble.

Another object of the present invention is to provide a service brake actuator having the above characteristics and which is not prone to leaks.

A further object of the present invention is to provide a service brake actuator having the above characteristics and which includes a diaphragm which is readily properly seated.

Still another object of the present invention is to provide a service brake actuator having the above characteristics and which does not rely on axial compression forces between parts of the actuator housing in order to hold the diaphragm in place.

Yet a further object of the present invention is to provide a service brake actuator having the above characteristics and which allows for the forces sustainable by the diaphragm to be readily varied.

These and other objects of the present invention are achieved by provision of a service brake actuator having a housing base having a center portion and a housing cover having a center portion. The center portion of the housing base and the center portion of the housing cover telescopingly fit together in an assembled position and define an annular space therebetween. A diaphragm having a thickness greater than the thickness of the annular space between the center portion of the housing base and the center portion of the housing cover is held in the annular space by radial forces generated by compression of the diaphragm in the annular space. It should be understood that the magnitude of the radial forces holding the diaphragm in the annular space is variable depending on the thickness of the annular space.

In one embodiment, the center portion of the housing cover telescopingly fits within the center portion of the housing base in an assembled position, and an annular inner surface of the center portion of the housing base and an annular outer surface of the center portion of the housing cover define the annular space therebetween. In this case, the magnitude of the radial forces holding the diaphragm in the annular space is increased by increasing a diameter of the annular outer surface of the center portion of the housing cover, by decreasing a diameter of the annular inner surface of the center portion of the housing base, or by doing both. Similarly, the magnitude of the radial forces holding the diaphragm in the annular space is decreased by decreasing a diameter of the annular outer surface of the center portion of the housing cover, by increasing a diameter of the annular inner surface of the center portion of the housing base, or by doing both.

In another embodiment, the center portion of the housing base telescopingly fits within the center portion of the housing cover in an assembled position, and an annular inner surface of the center portion of the housing cover and an annular outer surface of the center portion of the housing base define the annular space therebetween. In this case, the magnitude of the radial forces holding the diaphragm in the annular space is increased by increasing a diameter of the annular outer surface of the center portion of the housing base, by decreasing a diameter of the annular inner surface of the center portion of the housing cover, or by doing both. Similarly, the magnitude of the radial forces holding the diaphragm in the annular space is decreased by decreasing a diameter of the annular outer surface of the center portion of the housing base, by increasing a diameter of the annular inner surface of the center portion of the housing cover, or by doing both.

Preferably, a clamp ring is provided for holding the housing base and the housing cover together in the assembled position, the clamp ring exerting substantially no compressive axial forces on the diaphragm. In one embodiment, the clamp ring comprises a two-piece clamp ring having two pieces bolted together. Also preferably, the diaphragm includes an outwardly projecting peripheral annular flange located outside of the annular space, the annular flange inhibiting the diaphragm from being pulled through the annular space under forces to which the diaphragm is subject.

The invention and its particular features and advantages will become more apparent from the following detailed description considered with reference to the accompanying drawings.

DETAILED DESCRIPTION OF THE INVENTION

Figure 1:
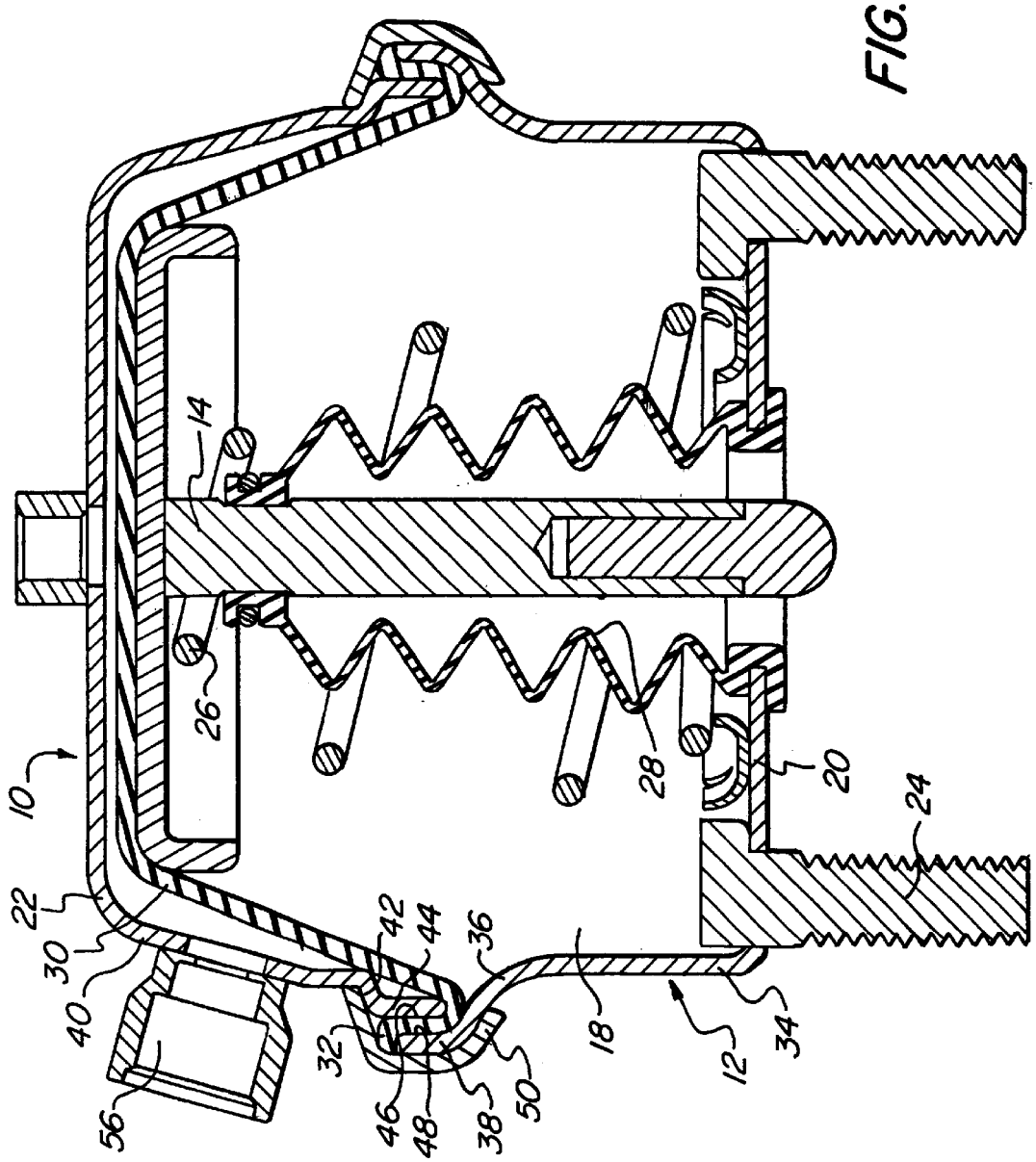
FIG. 1 is a partially cross-sectional side view of a service brake actuator in accordance with one embodiment of the present invention.

Referring first to FIG. 1, a service brake actuator 10 in accordance with one embodiment of the present invention is shown, illustrated here as a single-diaphragm air brake actuator. The brake actuator 10 includes a service chamber assembly 12 having a push rod 14 attached to a service side piston 16. The service chamber assembly 12 includes a service housing base 20 and a service housing cover 22 which define a non-pressure chamber 18 which encloses a return spring 26. Conventional bolts 24 may also be provided for mounting brake actuator 10, and a bellows 28 may be provided to protect push rod 14. It should be understood that service brake actuators having those elements described above are well known, and a detailed description of such elements is, therefore, not provided. It should also be understood that brake actuators having designs other than that described above may also be suitable for use with the present invention.

As will be understood by those skilled in the art, fluid actuated or "air brakes" of this nature are controlled by the movement of one or more flexible diaphragms and rigid piston plates which combine to form a movable wall when actuated by air pressure differentials created in the various chambers of the brake actuator 10. To this end, the brake actuator 10 is equipped with a flexible, cup-shaped, and generally circular diaphragm 30 which may or may not be provided with an outwardly projecting peripheral annular flange 32. The diaphragm 30 is formed of a resilient material such as rubber, neoprene, fabric-center reinforced neoprene or the like.

Housing base 20 includes a lower portion 34 which may be generally cylindrical or generally frustoconical, as is known in the art, which flares annularly outwardly at a shoulder portion 36 to a generally cylindrical center portion 38. Similarly, housing cover 22 includes an upper portion 40 which may be generally cylindrical or generally frustoconical, as is known in the art, which flares annularly outwardly at a shoulder portion 42 to a generally cylindrical center portion 44. Center portion 38 of housing base 20 and center portion 44 of housing cover 22 are sized such that diaphragm 30 fits tightly in an annular space defined by an outer surface 46 of center portion 44 of housing cover 22 and an inner surface 48 of center portion 38 of housing base 20, and diaphragm 30 forms a hermetic or air-tight seal by its compression within the annular space. To this end, the annular space between outer surface 46 of center portion 44 of housing cover 22 and inner surface 48 of center portion 38 of housing base 20 is smaller than the thickness of diaphragm 30 when diaphragm 30 is uncompressed.

Therefore, diaphragm 30 is held in position between outer surface 46 of center portion 44 of housing cover 22 and inner surface 48 of center portion 38 of housing base 20 by radial forces caused by the radial compression of diaphragm in the annular space therebetween. Unlike the prior art, it is these radial forces which holds diaphragm 30 in place, and not any axial forces between housing parts. As such, the force with which diaphragm 30 is held between housing cover 22 and housing base 20 can be varied simply by varying the size of the annular space between outer surface 46 of center portion 44 of housing cover 22 and inner surface 48 of center portion 38 of housing base 20. For example, if it is desired to hold diaphragm 30 with greater force, either the diameter of outer surface 46 of center portion 44 of housing cover 22 could be increased, the diameter of inner surface 48 of center portion 38 of housing base 20 could be decreased, or both. Similarly, if it is desired to hold diaphragm 30 with less force, either the diameter of outer surface 46 of center portion 44 of housing cover 22 could be decreased, the diameter of inner surface 48 of center portion 38 of housing base 20 could be increased, or both. It should be understood, however, that the annular space between outer surface 46 of center portion 44 of housing cover 22 and inner surface 48 of center portion 38 of housing base 20 should always be smaller than the thickness of diaphragm 30 when diaphragm 30 is uncompressed so as to provide radial holding forces.

Outwardly projecting peripheral annular flange 32 of diaphragm 30, when provided, is located outside of the annular space between outer surface 46 of center portion 44 of housing cover 22 and inner surface 48 of center portion 38 of housing base 20. Annular flange 32 may aid in retention in that it may inhibit diaphragm 30 from being pulled through the annular space under the forces to which the diaphragm is subject.

In order to hold the housing base 20 and housing cover 22 together, a clamp ring 50 is positioned over shoulder portion 36 of housing base 20 shoulder portion 42 of housing cover 22. It should be understood, however, that clamp ring 50 functions only to prevent housing base 20 and housing cover 22 from being separated, and that clamp ring 50 exerts substantially no compressive axial forces on diaphragm 30.

Figure 2:
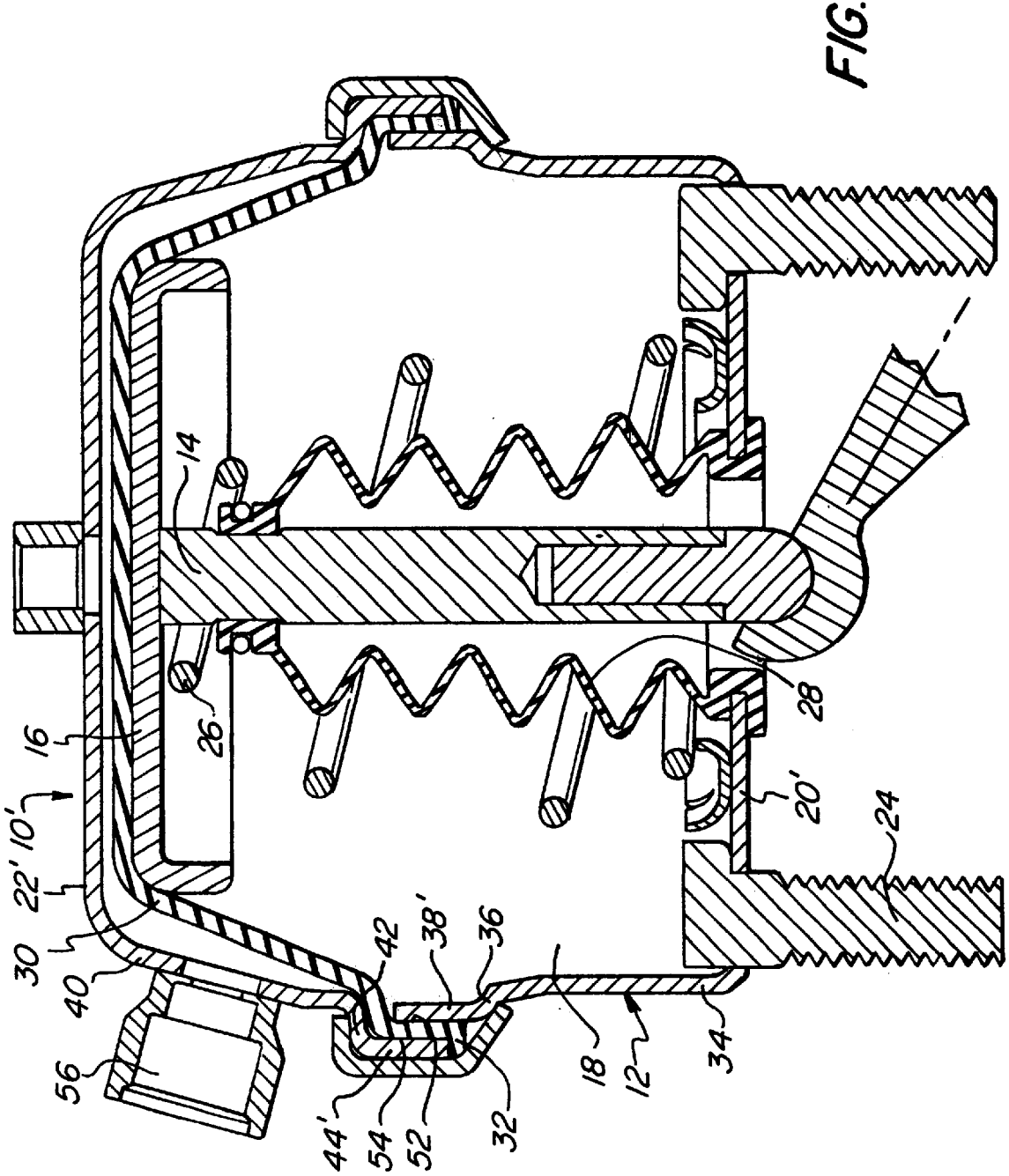
FIG. 2 is a partially cross-sectional side view of a service brake actuator in accordance with another embodiment of the present invention.

Referring now to FIG. 2, a service brake actuator 10' in accordance with another embodiment of the present invention is shown, with like elements bearing like reference numerals. The main difference between the embodiment illustrated in FIG. 2 as compared to the embodiment illustrated in FIG. 1 is that instead of center portion 44 of housing cover 22 fitting within center portion 38 of housing base 20, it is center portion 38' of housing base 20' which fits within center portion 44' of housing cover 22'. As such, the annular space is defined by an outer surface 52 of center portion 38' of housing base 20' and an inner surface 52 of center portion 44' of housing cover 22', rather than by an outer surface 46 of center portion 44 of housing cover 22 and an inner surface 48 of center portion 38 of housing base 20. In all other material respects, the embodiments function in the same manner.

With reference to both FIGS. 1 and 2, in the normal service brake mode, air is injected under pressure through an inlet 56 causing the diaphragm 30 and service side piston 16 to move downwardly. It will be understood that the diaphragm 30 and the service side piston 16 form a movable wall which is air-pressure responsive. The downward movement of this movable wall causes the push rod 14 to thrust out from the service housing base 22 to set the vehicle brakes.

Figure 3:
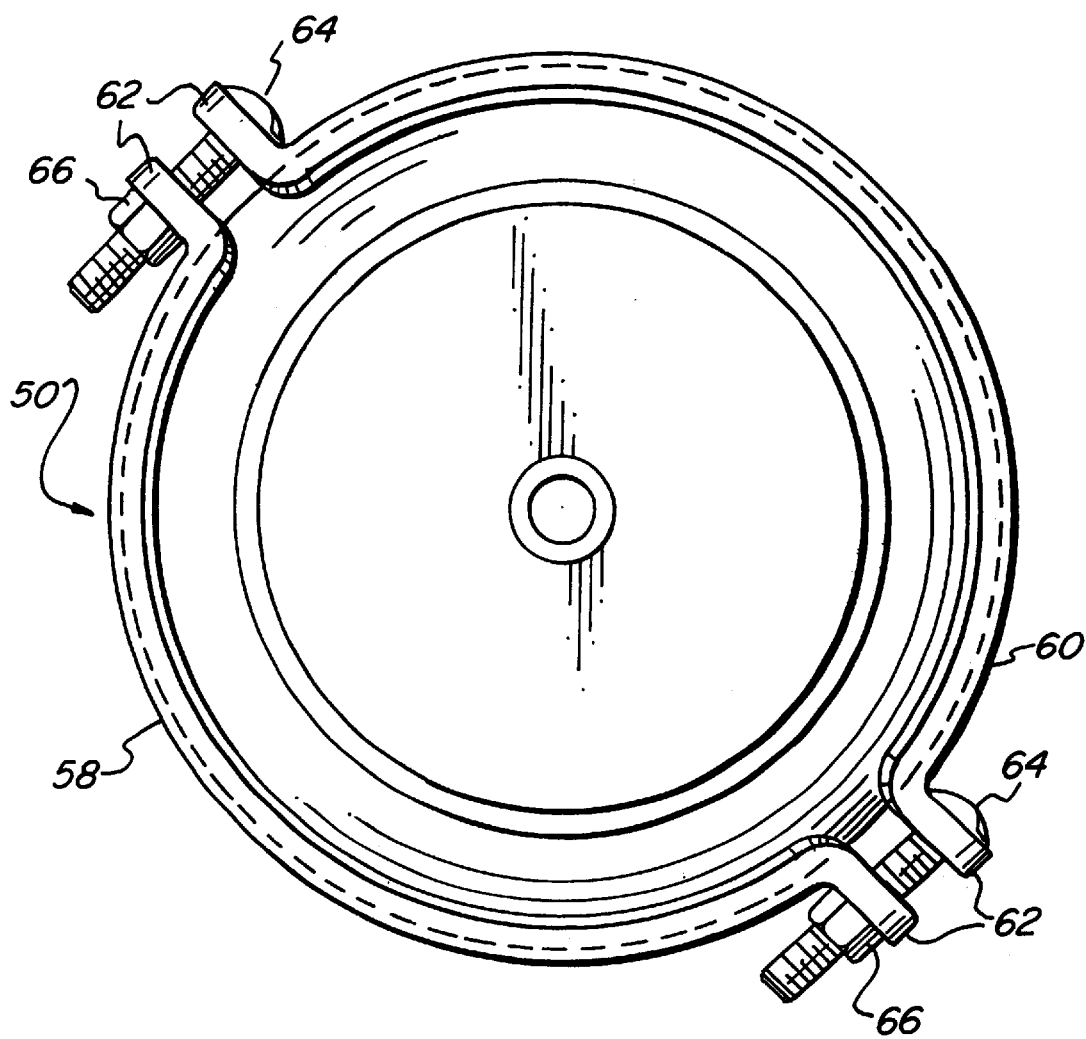
FIG. 3 is a top view of the service brake actuator shown in FIGS. 1 and 2 illustrating an embodiment of a clamp band having two retaining bolts.

Referring now to FIG. 3, one embodiment of the clamp ring 50 is shown in greater detail, this embodiment having two semi-circular portions 58 and 60. Each semi-circular portion 58,60 having tabs or ears 62 through which clamp retaining bolts 64 are inserted to tighten the clamp ring 50 in position by tightening retaining nuts 66 on the clamp retaining bolts 64. That is, the clamp ring 50 secures the housing base 20 to the housing cover 22 with the diaphragm 30 forming an air-tight seal therebetween. It should be noted, however, that clamp ring 50 functions only to prevent housing base 20 and housing cover 22 from being separated, and that clamp ring 50 exerts substantially no compressive axial forces on diaphragm 30. Other types of clamp rings, such as a one-piece, single-bolt clamp of this type, are also well known in the art and can be utilized with the present invention.

Figure 4:
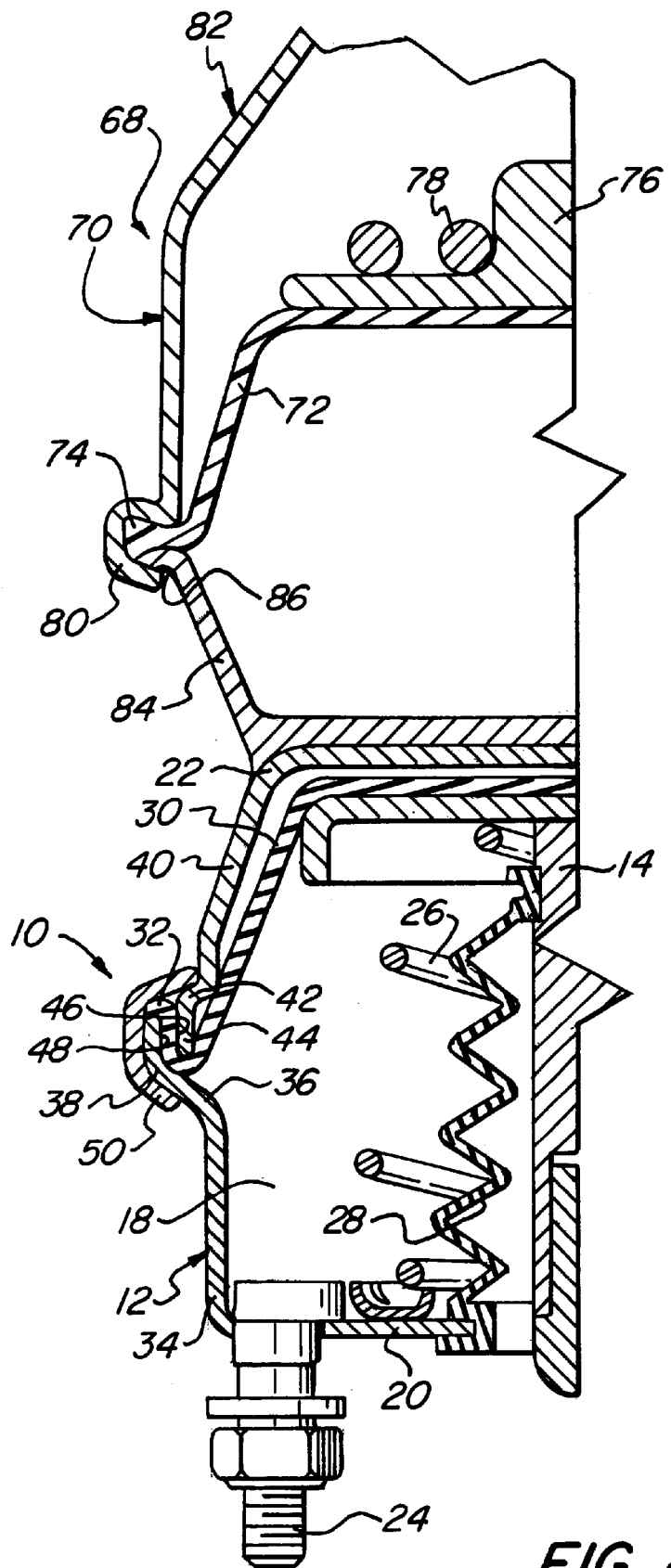
FIG. 4 is a simplified partially cross-sectional side view of a two-chamber brake actuator incorporating the service brake actuator of FIG. 1.

In another embodiment of the present invention, and referring now to FIG. 4, a two-chamber brake actuator assembly 68 is shown generally. Like elements are designated using the same reference numerals as in the embodiment shown in FIG. 1. Also, it is to be understood that while the present invention is described in connection with a specific type of brake actuator and has been illustrated with reference to both a one-chamber brake actuator and a two-chamber brake actuator, other fluid brake actuators may be made in accordance with the present invention such as piston type brake actuators, without regard to the type of brakes, cam, disc, or wedge, actuated by the brake actuator and with or without external tube breather systems. The present invention is adaptable to virtually any brake actuator wherein a diaphragm is compressed between a first housing and housing cover or a service housing and a flange case or the like and all of these devices are intended to come within the scope of the present invention.

The two-chamber air brake actuator 68 includes a service chamber assembly 12, substantially as described above with reference to FIG. 1, and a spring chamber assembly 70. The spring chamber assembly 70 includes a spring side diaphragm 72 having an expanded portion 74 which is in the nature of an integral O-ring or the like. A spring side piston 76 and a power spring 78 are disposed within the spring chamber assembly 70. An annular retaining member 80 disposed on the spring chamber assembly 70 provides a tamper-resistant closure or attachment of the head 82 of the spring chamber assembly 70 to the flange case 84. The retaining member 80 in this embodiment is in the nature of a circular channel clamp which receives flange 86 thereby causing the compression of the expanded portion 74 of the diaphragm 72.

It should be understood that spring chamber assemblies having those elements described above are well known, and a detailed description of such elements is, therefore, not provided. It should also be understood that spring chamber assemblies having designs other than that described above are also suitable for use with the present invention, and the above-described spring chamber assembly design is described for illustration only.

The present invention, therefore, provides a service brake actuator which is easy to assemble, which is not prone to leaks, which includes a diaphragm which is readily properly seated, which does not rely on axial compression forces between parts of the actuator housing in order to hold the diaphragm in place, and which allows for the forces sustainable by the diaphragm to be readily varied.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A service brake actuator comprising:
   a housing base having a center portion;
   a housing cover having a center portion;
   wherein the center portion of said housing base and the center portion of said housing cover telescopingly fit together in an assembled position and define an annular space therebetween;
   a diaphragm having a thickness greater than a thickness of the annular space between the center portion of said housing base and the center portion of said housing cover, said diaphragm held in the annular space by radial forces generated by compression of said diaphragm in the annular space; and
   a clamp ring holding said housing base and said housing cover together in the assembled position, said clamp ring exerting substantially no compressive axial forces on said diaphragm.

2. The service brake actuator of claim 1 wherein a magnitude of the radial forces holding said diaphragm in the annular space is variable depending on the thickness of the annular space.

3. The service brake actuator of claim 1 wherein said clamp ring comprises a two-piece clamp ring having two pieces bolted together.

4. The service brake actuator of claim 1 wherein said diaphragm further comprises an outwardly, projecting peripheral annular flange located outside of the annular space, said annular flange inhibiting said diaphragm from being pulled through the annular space under forces to which said diaphragm is subject.

5. A service brake actuator comprising:
   a housing base having a center portion, the center portion having an annular inner surface;
   a housing cover having a center portion, the center portion having an annular outer surface;
   wherein the center portion of said housing cover telescopingly fits within the center portion of said housing base in an assembled position, and wherein the annular inner surface of the center portion of said housing base and the annular outer surface of the center portion of said housing cover define an annular space therebetween;
   a diaphragm having a thickness greater than a thickness of the annular space, said diaphragm held in the annular space by radial forces generated by compression of said diaphragm in the annular space; and
   wherein a magnitude of the radial forces holding said diaphragm in the annular space is variable depending on the thickness of the annular space and wherein the magnitude of the radial forces holding said diaphragm in the annular space is increased by increasing a diameter of the annular outer surface of the center portion of said housing cover, by decreasing a diameter of the annular inner surface of the center portion of said housing base, or by doing both.

6. The service brake actuator of claim 5 wherein the magnitude of the radial forces holding said diaphragm in the annular space is decreased by decreasing a diameter of the annular outer surface of the center portion of said housing cover, by increasing a diameter of the annular inner surface of the center portion of said housing base, or by doing both.

7. The service brake actuator of claim 5 further comprising a clamp ring holding said housing base and said housing cover together in the assembled position, said clamp ring exerting substantially no compressive axial forces on said diaphragm.

8. The service brake actuator of claim 7 wherein said clamp ring comprises a two-piece clamp ring having two pieces bolted together.

9. The service brake actuator of claim 5 wherein said diaphragm further comprises an outwardly projecting peripheral annular flange located outside of the annular space, said annular flange inhibiting said diaphragm from being pulled through the annular space under forces to which said diaphragm is subject.

10. A service brake actuator comprising:
    a housing base having a center portion, the center portion having an annular outer surface;
    a housing cover having a center portion, the center portion having an annular inner surface;
    wherein the center portion of said housing base telescopingly fits within the center portion of said housing cover in an assembled position, and wherein the annular inner surface of the center portion of said housing cover and the annular outer surface of the center portion of said housing base define an annular space therebetween; and a diaphragm having a thickness greater than a thickness of the annular space, said diaphragm held in the annular space by radial forces generated by compression of said diaphragm in the annular space, said diaphragm including an outwardly projecting peripheral annular flange located outside of the annular space, said annular flange inhibiting said diaphragm from being pulled through the annular space under forces to which said diaphragm is subject.

11. The service brake actuator of claim 10 wherein a magnitude of the radial forces holding said diaphragm in the annular space is variable depending on the thickness of the annular space.

12. The service brake actuator of claim 11 wherein the magnitude of the radial forces holding said diaphragm in the annular space is increased by increasing a diameter of the annular outer surface of the center portion of said housing base, by decreasing a diameter of the annular inner surface of the center portion of said housing cover, or by doing both.

13. The service brake actuator of claim 11 wherein the magnitude of the radial forces holding said diaphragm in the annular space is decreased by decreasing a diameter of the annular outer surface of the center portion of said housing base, by increasing a diameter of the annular inner surface of the center portion of said housing cover, or by doing both.

14. The service brake actuator of claim 10 further comprising a clamp ring holding said housing base and said housing cover together in the assembled position, said clamp ring exerting substantially no compressive axial forces on said diaphragm.

15. The service brake actuator of claim 14 wherein said clamp ring comprises a two-piece clamp ring having two pieces bolted together.

16. A two-chamber air brake actuator comprising:

a spring chamber assembly; and a service brake assembly joined in tandem with said spring chamber assembly, said service brake assembly comprising:

a housing base having a center portion;

a housing cover having a center portion;

wherein the center portion of said housing base and the center portion of said housing cover telescopingly fit together in an assembled position and define an annular space therebetween;

a diaphragm having a thickness greater than a thickness of the annular space between the center portion of said housing base and the center portion of said housing cover, said diaphragm held in the annular space by radial forces generated by compression of said diaphragm in the annular space; and a clamp ring holding said housing base and said housing cover together in the assembled position, said clamp ring exerting substantially no compressive axial forces on said diaphragm.

17. The service brake actuator of claim 16 wherein a magnitude of the radial forces holding said diaphragm in the annular space is variable depending on the thickness of the annular space.

18. The service brake actuator of claim 16 wherein said clamp ring comprises a two-piece clamp ring having two pieces bolted together.

19. The service brake actuator of claim 16 wherein said diaphragm further comprises an outwardly projecting peripheral annular flange located outside of the annular space, said annular flange inhibiting said diaphragm from being pulled through the annular space under forces to which said diaphragm is subject.

* * * * *